(12) United States Patent
Querre

(10) Patent No.: US 9,043,701 B2
(45) Date of Patent: May 26, 2015

(54) METHOD AND APPARATUS FOR INDICATING THE IMPAIRED SEQUENCES OF AN AUDIOVISUAL DOCUMENT

(75) Inventor: Goulven Querre, Noyal sur Vilaine (FR)

(73) Assignee: Thomson Licensing, Boulogne, Billancourt (FR)

( * ) Notice: Subject to any disclaimer, the term of this patent is extended or adjusted under 35 U.S.C. 154(b) by 942 days.

(21) Appl. No.: 11/323,149

(22) Filed: Dec. 30, 2005

(65) Prior Publication Data

US 2006/0150102 A1    Jul. 6, 2006

(30) Foreign Application Priority Data

Jan. 6, 2005 (FR) ...................................... 05 50045

(51) Int. Cl.
G06F 3/048 (2013.01)
G06F 3/00 (2006.01)
G11B 20/10 (2006.01)
G11B 20/18 (2006.01)

(52) U.S. Cl.
CPC ................ G11B 20/10 (2013.01); G11B 20/18 (2013.01)

(58) Field of Classification Search
USPC ................. 715/716, 728, 723, 727, 720, 719; 725/5
See application file for complete search history.

(56) References Cited

U.S. PATENT DOCUMENTS

| | | | | |
|---|---|---|---|---|
| 5,485,518 A * | 1/1996 | Hunter et al. | ................... | 725/28 |
| 5,724,100 A * | 3/1998 | Kuchibhotla | ............ | 375/240.24 |
| 5,781,564 A * | 7/1998 | Peterson | ...................... | 714/747 |
| 5,828,402 A * | 10/1998 | Collings | ........................ | 725/28 |
| 5,995,133 A * | 11/1999 | Kim | ................................ | 725/28 |
| 6,088,455 A * | 7/2000 | Logan et al. | .................. | 380/200 |
| 6,166,780 A * | 12/2000 | Bray | .............................. | 348/632 |
| 6,230,320 B1 * | 5/2001 | Gakumura | ...................... | 725/25 |
| 6,404,978 B1 | 6/2002 | Abe | | |
| 6,744,986 B1 * | 6/2004 | Vohra | .............................. | 398/83 |
| 6,847,778 B1 * | 1/2005 | Vallone et al. | .................. | 386/68 |

(Continued)

FOREIGN PATENT DOCUMENTS

EP 0977172 2/2000
EP 1056297 11/2000

(Continued)

OTHER PUBLICATIONS

Patent Abstracts of Japan, vol. 2003, No. 12, Dec. 5, 2003 (Matsushita Electric) and JP 2004-349977 (See Ref. AF).

(Continued)

*Primary Examiner* — Amy Ng
*Assistant Examiner* — Erik Stitt
(74) *Attorney, Agent, or Firm* — Jeffrey D. Carter

(57) ABSTRACT

During reproduction of an audio or audiovisual document, a document is read from a recording medium. The audio or audiovisual content of the non impaired sequences, which represent sequences of the document which are not defective, are fully recorded. Impaired sequences of the document, which are defective sequences of the document are not recorded, but are represented by an identifier and information corresponding to the duration of the impaired sequences. The recorded sequences are then reproduced and a graphics menu representing the content of the document is displayed. The menu indicates the location of the impaired sequences with respect to the non impaired sequences and the duration of the impaired sequences.

10 Claims, 4 Drawing Sheets

(56) References Cited

U.S. PATENT DOCUMENTS

| | | | |
|---|---|---|---|
| 6,972,802 B2* | 12/2005 | Bray | 348/468 |
| 6,990,151 B2* | 1/2006 | Kim et al. | 375/240.27 |
| 6,993,075 B2* | 1/2006 | Kim et al. | 375/240.12 |
| 7,139,031 B1* | 11/2006 | Bray | 348/468 |
| 7,295,711 B1* | 11/2007 | Ahuja et al. | 382/225 |
| 7,360,234 B2* | 4/2008 | Robson et al. | 725/127 |
| 7,380,258 B2* | 5/2008 | Durden et al. | 725/25 |
| 7,526,784 B2* | 4/2009 | Jarman | 725/28 |
| 7,543,318 B2* | 6/2009 | Jarman | 725/28 |
| 7,577,970 B2* | 8/2009 | Jarman | 725/25 |
| 7,861,268 B2* | 12/2010 | Kwak | 725/47 |
| 2001/0005399 A1* | 6/2001 | Kimoto | 375/240.27 |
| 2001/0020953 A1* | 9/2001 | Moriwake et al. | 345/723 |
| 2001/0027544 A1* | 10/2001 | Joncour | 714/704 |
| 2002/0012526 A1 | 1/2002 | Sai et al. | |
| 2002/0037151 A1* | 3/2002 | Goto et al. | 386/46 |
| 2002/0075572 A1 | 6/2002 | Boreczky et al. | |
| 2002/0147782 A1* | 10/2002 | Dimitrova et al. | 709/207 |
| 2003/0035487 A1* | 2/2003 | Chan | 375/240.27 |
| 2003/0090505 A1* | 5/2003 | McGee et al. | 345/721 |
| 2003/0194211 A1* | 10/2003 | Abecassis | 386/69 |
| 2004/0006767 A1* | 1/2004 | Robson et al. | 725/28 |
| 2004/0139462 A1* | 7/2004 | Hannuksela et al. | 725/32 |
| 2005/0018711 A1 | 1/2005 | Kudo et al. | |
| 2005/0185921 A1* | 8/2005 | Skran et al. | 386/52 |
| 2006/0013318 A1* | 1/2006 | Webb et al. | 375/240.25 |
| 2006/0031870 A1* | 2/2006 | Jarman et al. | 725/25 |
| 2006/0130121 A1* | 6/2006 | Candelore et al. | 725/145 |
| 2006/0236220 A1* | 10/2006 | Jarman | 715/500.1 |
| 2007/0083815 A1* | 4/2007 | Delorme et al. | 715/723 |
| 2008/0084934 A1* | 4/2008 | Agrawal | 375/240.27 |
| 2010/0138883 A1* | 6/2010 | Pedlow, Jr. | 725/95 |

FOREIGN PATENT DOCUMENTS

| | | |
|---|---|---|
| FR | 2814255 | 3/2002 |
| JP | 09238238 | 9/1997 |
| JP | 200143618 | 2/2001 |
| JP | 2001292402 | 10/2001 |
| JP | 2003125378 | 4/2003 |
| JP | 2003199008 | 7/2003 |
| JP | 2004120476 | 4/2004 |
| JP | 2004-349977 | 12/2004 |
| WO | WO9834181 | 8/1998 |
| WO | WO 03/098626 | 11/2003 |

OTHER PUBLICATIONS

Patent Abstracts of Japan, vol. 2003, No. 12, Dec. 5, 2003 (Alpine Electronics Inc.) & JP 2004-178638 (See Ref. AG).

Patent Abstracts of Japan, vol. 1999, No. 12, Oct. 29, 1999 (Canon Inc.) & JP 11-196373 (See Ref. AH).

Database WPI, Section El, Week 200528, Derwent Publications Ltd., London, GB & US 2005/018711 (Tomoaki Kudo et al) Jan. 27, 2005.

Search Report Dated Sep. 7, 2005.

* cited by examiner

METHOD AND APPARATUS FOR INDICATING THE IMPAIRED SEQUENCES OF AN AUDIOVISUAL DOCUMENT

FIELD OF THE INVENTION

The present invention relates to a method of reproducing documents comprising impaired sequences and to a reproduction device making it possible to reproduce a document according to the method.

BACKGROUND

Nowadays, a user of a device for reproducing audio or audiovisual documents can obtain them in various ways. If the document is audiovisual, it may originate from audiovisual stations accessible with the aid of a television receiver. These stations transmit audiovisual documents that can be recorded on a medium such as a magnetic cassette or a hard disk integrated with the receiver. If the document is audio, it may originate from a CD, from a digital network and be downloaded in compressed form, in MP3 format for example. In all cases, the document is received and recorded in digital form. Once the document has been recorded, the user can select it with the aid of a guide which displays an identifier of each document, and can run the reproduction.

If the reading medium is defective or if reception is not good, the device will have problems in reproducing the document recorded in this medium. If the audiovisual content is in digital form, the document is made up of digital data packets interlinked by chaining. During reproduction, the device reads all the packets and monitors the integrity of their contents; those that have not undergone any impairment will be read correctly whereas the others will be reproduced by incoherent signals. According to the reading software, reproduction may be interrupted, or loop back to a sequence which is repeated indefinitely until the user intervenes.

It is easily noted that the presence of impaired data seriously hinders reproduction and requires the intervention of a user when the device reads a defective sector.

Certain systems may read in advance a sequence of a document recorded on a medium and store it temporarily in an electronic circuit. The system monitors the integrity of the data and in the event of a defect, executes a new reading of a sequence of the medium. If the data read are still incorrect, the system reproduces incoherent signals for a few seconds and passes automatically to another sequence. In this way, the user is immediately aware of the defect, he thus knows that the medium is defective or that the data recorded are not correct. Such systems are found, in particular in a personal CD player.

Such systems do not require user interventions but have the drawback of needlessly reading impaired data. Moreover, when the impairment is definitive, the sectors possessing impaired data needlessly occupy memory room.

The present invention makes it possible at one and the same time to warn the user that the document currently being read exhibits impaired sectors and optimizes the memory room occupied by the document.

SUMMARY OF THE INVENTION

The subject of the present invention is a method of reproducing audio or audiovisual documents divided into sequences; wherein it comprises the following steps at the level of a device:

reading of a recorded document, the audio or audiovisual content of the no impaired sequences being fully recorded but not that of the impaired sequences, the impaired sequences being represented by at least one identifier and a duration, reproduction of the recorded document by reproducing only the no impaired sequences concomitantly with the displaying of a graphics menu representing at least one part of the content of the document by indicating the location of the impaired sequences with respect to the no impaired sequences and the duration of the impaired sequences.

In this way, the user can hear and/or see a document while being able to take cognizance of the impaired parts of this document, these impaired parts, not being recorded, does not needlessly occupy memory room.

According to a first improvement, the method comprises prior steps of reception of the audio or audiovisual document, of detection in the document of impaired sequences and of recording of the document. Only the no impaired sequences are recorded in full, the impaired sequences are represented by at least an identifier and duration. In this way, the memory is not used to store impaired and hence unusable data.

According to another improvement, the menu shows graphically the ratios between the durations of the impaired sequences and the durations of the no impaired sequences. In this way, the user can immediately see the size and the quantity of impaired sequences contained in his document.

According to another improvement, if two consecutive impaired sequences are detected, then a single identifier and a single duration whose value is the aggregate value of the two sequences are at least recorded so as to represent the two sequences. In this way, it is possible to reduce the number of descriptors of the sequences recorded in memory.

According to another improvement, a sound signal is emitted when reproduction reaches an impaired sequence. According to another improvement, a message indicating the interruption of reproduction is displayed when the reading of an impaired sequence occurs in the course of reproduction. Reproduction recommences subsequent to an introduction of a command by the user. In this way, the user is perfectly aware that an impaired sequence has been encountered.

According to another improvement, the user selects the documents with the aid of a program guide presenting the various recorded documents. The guide displays an indication in respect of documents possessing at least one impaired sequence. Thus, the user will not be surprised that impaired sequences disrupt reproduction.

The subject of the invention is also a device for displaying audio or audiovisual documents comprising a means of storage and a means of reproduction of a document, wherein only the no impaired sequences of the document are fully recorded, the contents of the impaired sequences not being recorded and these sequences are represented by at least one identifier and a duration, the means of reproduction reproduces only the no impaired sequences and triggers the display of a graphics menu representing the content of the document by indicating the location of the impaired sequences with respect to the no impaired sequences and the duration of the impaired sequences.

BRIEF DESCRIPTION OF THE DRAWINGS

The invention, with its characteristics and advantages, will emerge more clearly on reading the description of a particular no limiting exemplary embodiment given with reference to the appended drawings in which.

DETAILED DESCRIPTION

Figure 1:
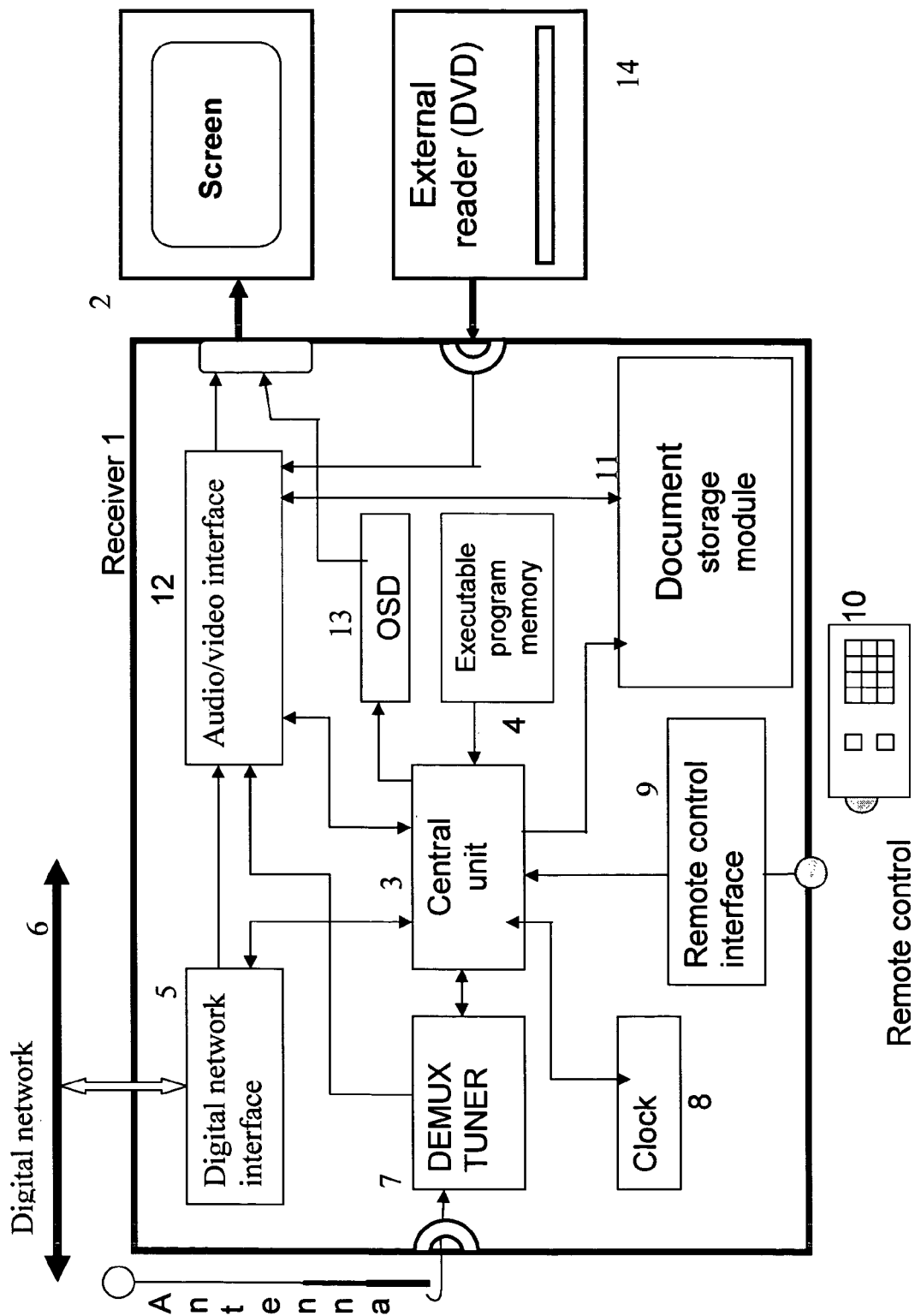
FIG. 1 is a block diagram of a device for reproducing a document according to a preferred exemplary embodiment of the invention.

We shall firstly describe an exemplary device for implementing the invention. FIG. 1 presents a multimedia receiver 1 furnished with a display device 2 such as a display screen. The receiver 1 may be a television receiver or an audiovisual terminal fitted with means of communication to a high speed network, or a stand-alone terminal for displaying audiovisual documents. The receiver 1 comprises a central unit 3 linked inter alia to a memory 4 containing executable programs, a clock 8, an interface for receiving infrared signals 9 for receiving the signals from a remote control 10, audio/video decoding logic 12 for creating the audiovisual signals dispatched to the television screen 2, and an interface 5 for communication with a high speed digital network 6 making it possible to receive audio/video data. The network 6 is for example an IEEE 1394 network. The receiver also comprises means of reception 7 such as a tuner and a demultiplexer for receiving audiovisual documents from a transmission network. The receiver furthermore comprises a storage unit 11 for holding audiovisual documents. The storage medium used may be a magnetic cassette, a hard disk or an optical disk, it may be removable or non removable. The storage unit 11 is either integrated into the receiver 1, or linked to the receiver 1. If said unit is not integrated into the receiver, the storage unit must remain under its control. The control of this unit is performed by storage software recorded in the memory 4. The remote control 10 is fitted with ↑, ↓, → and ← navigation keys, for document selection and inter alia with keys marked "OK", "Program +", "Program −".

The receiver also comprises a circuit 13 for displaying data on the screen, often called an OSD circuit, the initials standing for "On Screen Display". The OSD circuit 13 is a text and graphic generator which makes it possible to screen menus, pictograms (for example, a number corresponding to the station displayed) or requests destined for the user. The OSD circuit is controlled by the Central Unit 3 in association with executable reproduction software recorded in the memory 4. In an optional manner, the receiver is connected to a unit for reading 14 of a removable medium for recording audiovisual documents. The reading unit 14 is typically an optical disk reader, it may be external to the receiver 1 (as shown by FIG. 1) or integrated into the latter.

The receiver 1 may be integrated into the display screen, such a display device is typically a television. A variant consists in the receiver 1 and the screen 2 being two separate elements.

Figure 2:
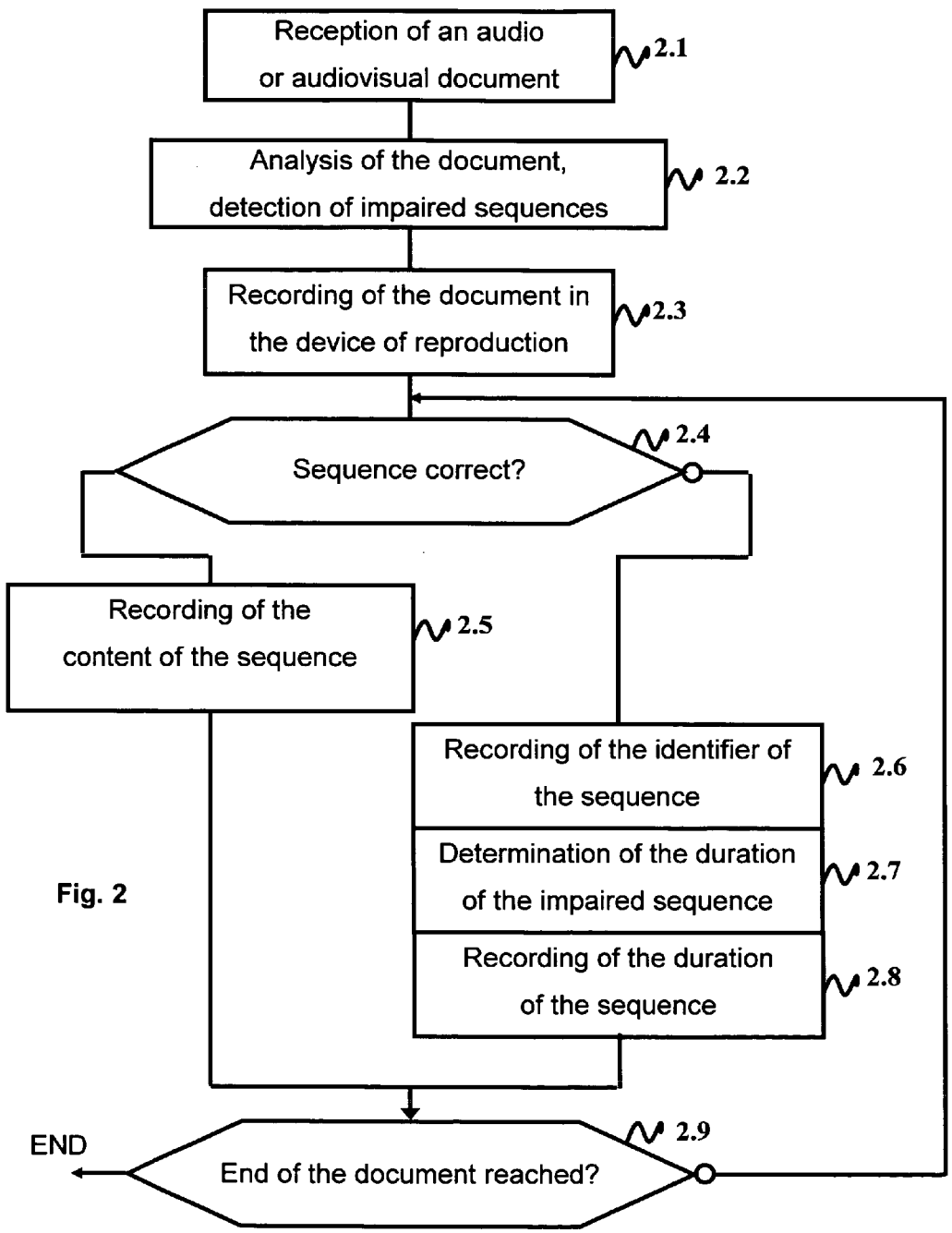
FIG. 2 shows a flowchart of software for recording audio or audiovisual documents according to a preferred exemplary embodiment of the invention.
Figure 3:
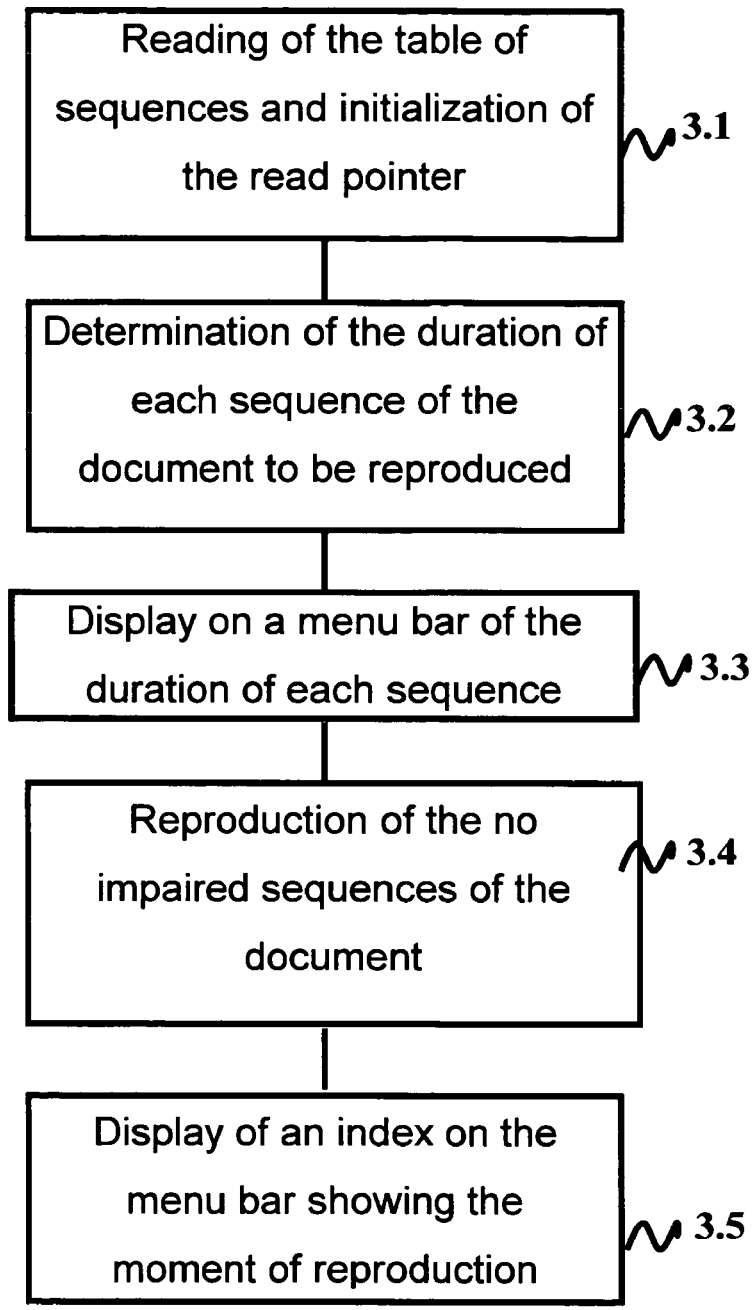
FIG. 3 shows a flowchart of software for reproducing documents according to a preferred exemplary embodiment of the invention.

After having described the various elements of the device, we shall now explain how they cooperate, with the aid of the flowcharts of FIGS. 2 and 3.

Firstly, the user runs an EPG which presents him with the various accessible documents, according to techniques that are well known per se. Let us assume that the user decides to download a content and to record it in the hard disk 11 of his device so as to view it later. In step 2.1, the document selected is received (either on the transmission network, or through the digital network 6, or read from the reader 14). According to a preferred embodiment, the reception is digital; therefore the documents are received as data packets. Each data packet contains an audiovisual sequence preceded by a header. The header contains a sequence identifier making it possible moreover to chain together the succession of sequences, and a sequence duration value. Other information is also possible such as: the moment at which the sequence starts with respect to the start of the document, the title of the sequence, the actors present, the text of the dialogues for subtitling, etc. In step 2.2, the content of the packets is analyzed to determine those possessing impairment. There are numerous ways of detecting impairments, the most frequent uses a "Checksum" of the data. In step 2.3 the recording of the document commences. If in step 2.4 the sequence to be recorded is detected without impairment, then its audio or audiovisual content is recorded in full (step 2.5). If on the other hand in step 2.4 the sequence to be recorded is detected with impairment, then the storage software records firstly only a sequence identifier (step 2.6). In step 2.7 the duration of the impaired sequence is determined, if the header of the sequence is correct, the duration contained in this header may be used. Otherwise, another means consists in analyzing the time pointers of the correct sequences before and after the impaired sequence and calculating the difference thereof, to deduce the duration there from. In step 2.8 the duration of the impaired sequence is recorded in association with the identifier. Next the storage software tests whether the end of the document has been reached (step 2.9). If such is not the case, the software loops back to step 2.4 to analyze a new sequence. Otherwise, the storage software terminates, the document selected by the user is recorded.

According to a preferred embodiment, the software for storage while recording updates a table of the sequences with at least the following data:

| Sequence number | Sequence impairment indicator | Sequence pointer | Sequence duration |
| --- | --- | --- | --- |
| 1 | No  | Pt-Seq1 | Dur. 1 |
| 2 | No  | Pt-Seq2 | Dur. 2 |
| 3 | Yes | —       | Dur. 3 |
| 4 | No  | Pt-Seq4 | Dur. 4 |
| 5 | Yes | —       | Dur. 5 |
| 6 | Yes | —       | Dur. 6 |
| 7 | No  | Pt-Seq7 | Dur. 7 |

According to the above example, the document recorded comprises 7 sequences whose identifiers are the chronological numbers from 1 to 7. For each sequence, the storage software has updated a flag indicating whether the sequence is or is not impaired (if the content is correct the value is "0", otherwise the value is "1"). If the content is correct, it is recorded at the address indicated in the third column, otherwise as the content is not recorded, the corresponding box is empty. The fourth column contains the duration of each sequence; it is updated whether or not the sequence is impaired. This preferred exemplary embodiment does not prevent the recording of other information associated with the sequences, such as for example the title, or a brief summary, or else an image.

According to an improvement, if two consecutive sequences having an impaired content are detected during recording, then the two sequences now form just one and the duration of the resulting sequence is the sum of the two durations. Specifically, it is needless to occupy two consecutive rows to record in the table the presence of two consecutive impaired sequences. During display, they will be represented as being a single sequence. In the above example, sequences 5 and 6 will be merged into a sequence numbered 5; the no impaired following sequence is renumbered 6.

We shall now explain how the reproduction software will read the document and inform the user of the presence of impaired sequences. The software is run when a user selects an audiovisual document contained in the hard disk 11 of his computer. The user can choose the document on the basis of a program guide (EPG for short). The guide displays a menu where the titles of all the documents appear column-wise. Advantageously, the guide displays an icon alongside the title of the document possessing at least one impaired sequence. In this way, the user will not be surprised by the interruption during reproduction.

An exemplary embodiment of the reproduction software is illustrated by the flowchart of FIG. 3. In step 3.1, the reproduction software reads the table of sequences and initializes the read pointer at the start of the document. The software totals up the durations of all the sequences and deduces there from the total duration of the document (step 3.2). It can thus determine the ratios between the durations of the impaired sequences of the no impaired sequences. In step 3.3, the software inlays onto the video image of the document a graphical bar whose length symbolizes the total duration of the document. The graphical bar is divided into portions representing each sequence, the color of each portion depends on the fact that the sequence is or is not impaired. Advantageously, the length of the portion displayed depends on the duration of the associated sequence, so that the user can see the ratios between the durations of the impaired sequences and those of the no impaired sequences. The software reproduces the no impaired sequences of the document (step 3.4) by reading them on the basis of the pointer value extracted from the table of sequences. According to an improvement, in the course of reproduction, an index represented by a vertical line moves over the graphical bar and indicates the place in the document at which the read pointer is situated. This step (step 3.5) is executed at the same time as the reproduction sequence 3.4.

Figure 4:
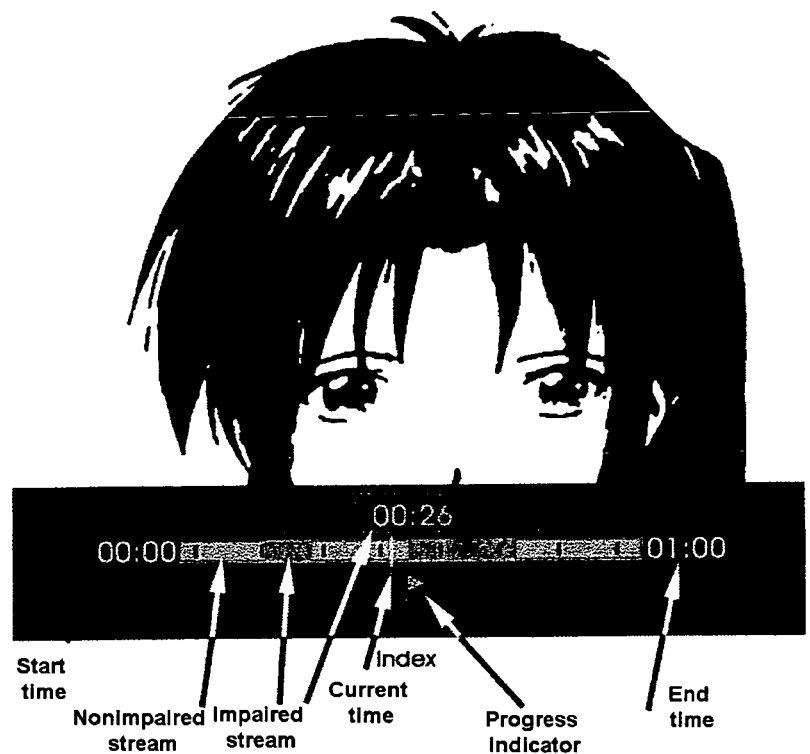
FIG. 4 is a screen shot showing a video content and a graphical bar representing a succession of impaired and no impaired sequences.

FIG. 4 shows an exemplary screen shot appearing when the user views documents recorded in the memory of the receiver. The video content appears in screen background and the reproduction software inlays a graphical bar at the bottom of the screen. This bar contains zones of different colors: light zones representing impaired sequences, and dark zones representing correctly recorded sequences. An index represented by a white vertical line moves over the graphical bar and shows the user the current moment of reproduction. The user can at any moment pass from one sequence to the next one or to the previous one by pressing the "program +" or "program −" buttons of his remote control. Advantageously, the graphical bar comprises time markers expressed for example in hours and minutes. Such a marker is placed alongside the index to temporally pinpoint the moment of reproduction.

According to an improvement, when, while reading the data of the table of sequences, the read pointer reaches an impaired sequence, the software emits a sound signal to the loudspeakers of the reproduction device. In this way, the user is more aware that an impaired sequence has been reached and passed, the software reproducing only the sequences whose content is actually recorded.

Figure 5:
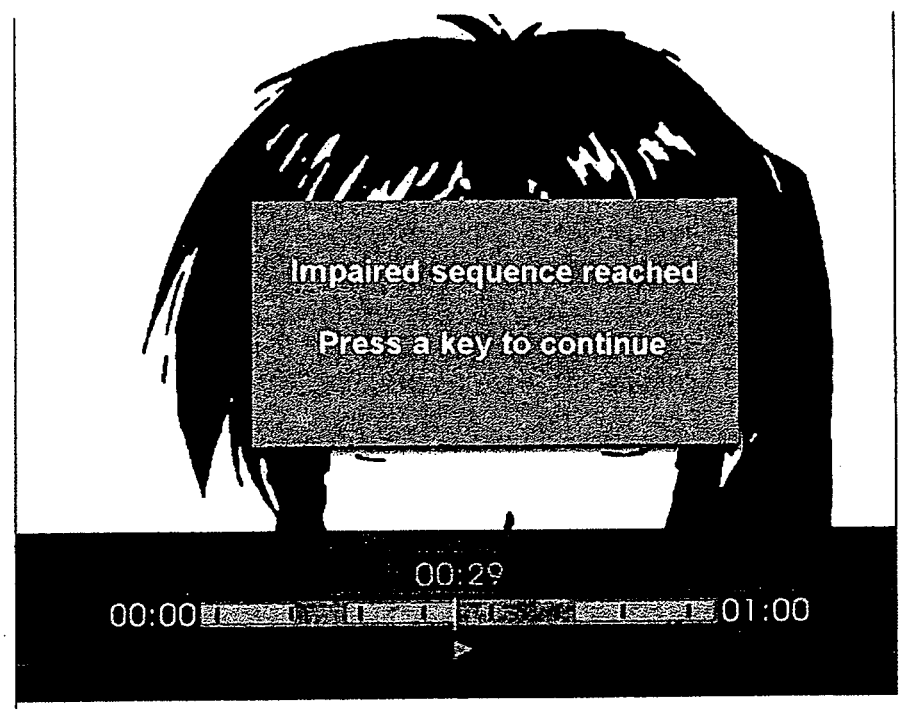
FIG. 5 is a screen shot showing a menu displayed when an impaired sequence is encountered according to an improvement of the present invention.

According to another improvement, the user may wish to be informed more directly that an impaired sequence has been reached in the course of reproduction. For this purpose, the software displays a message indicating the interruption of reproduction when an impaired sequence is reached. FIG. 5 shows such a message which is displayed in a window in addition to the graphical bar. Reproduction recommences when the user depresses a key on the remote control. The window containing the message then disappears from the screen.

The present invention is not limited to audiovisual documents but to any content apt to be perceived by a user. For example, an audio content, the invention is especially useful if the audio document is read from a CD reader and recorded in an MP3 reader fitted with a hard disk and with a navigation interface.

The present embodiments should be regarded by way of illustration but may be modified within the field defined by the scope of the appended claims. In particular, the invention is not limited to television decoders but may be applied to any device for receiving or restoring audiovisual documents.

The invention claimed is:

1. A method for operating a device, comprising:
receiving, via said device, a document having audio or audiovisual content, said document comprising a plurality of sequences including a non-impaired sequence and an impaired sequence;
detecting, via said device, said impaired sequence in said received document;
recording, via said device, said received document including said non-impaired sequence without recording said impaired sequence, wherein data indicating at least one identifier and a duration associated with said non-recorded impaired sequence is recorded;
reproducing, via said device, said recorded document by reproducing said non-impaired sequence representing a portion of said content of said document concurrently with a display of a graphics menu, said graphics menu visually indicating a location of said non-recorded impaired sequence with respect to said non-impaired sequence and said duration of said non-recorded impaired sequence;
providing, via said device, a visual message in response to reaching said impaired sequence during said reproduction of said recorded document; and
wherein said reproduction of said recorded document is interrupted in response to reaching said impaired sequence, and said visual message includes information for enabling a user to continue said reproduction of said recorded document.

2. The method of claim 1, wherein said graphics menu also visually indicates a ratio between a duration of said non-impaired sequence and said duration of said impaired sequence.

3. The method of claim 1, further comprised of providing a sound signal in response to reaching said impaired sequence during said reproduction of said recorded document.

4. The method of claim 1, wherein if a plurality of consecutive impaired sequences are detected, a single identifier and a single duration whose value is the aggregate value of said consecutive impaired sequences is recorded to represent said consecutive impaired sequences.

5. The method of claim 1, further comprised of presenting a list of recorded documents in which said received document possessing said impaired sequence is graphically highlighted.

6. A device, comprising:
an input for receiving a document having audio or audio-visual content, said document comprising a plurality of sequences including a non-impaired sequence and an impaired sequence; and
a processor for detecting said impaired sequence in said received document;
said processor enabling recording of said received document including said non-impaired sequence without recording said impaired sequence, wherein data indicating at least one identifier and a duration associated with said non-recorded impaired sequence is recorded;
said processor enabling reproduction of said recorded document by reproducing said non-impaired sequence representing a portion of said content of said document concurrently with a display of a graphics menu, said graphics menu visually indicating a location of said non-recorded impaired sequence with respect to said non-impaired sequence and said duration of said non-recorded impaired sequence; and wherein:
a visual message is provided in response to reaching said impaired sequence during said reproduction of said recorded document;
said reproduction of said recorded document is interrupted in response to reaching said impaired sequence; and
said visual message includes information for enabling a user to continue said reproduction of said recorded document.

7. The device of claim 6, wherein said graphics menu also visually indicates a ratio between a duration of said non-impaired sequence and said duration of said impaired sequence.

8. The device of claim 6, wherein a sound signal is provided in response to reaching said impaired sequence during said reproduction of said recorded document.

9. The device of claim 6, wherein if a plurality of consecutive impaired sequences are detected, a single identifier and a single duration whose value is the aggregate value of said consecutive impaired sequences is recorded to represent said consecutive impaired sequences.

10. The device of claim 6, wherein a list of recorded documents is presented in which said received document possessing said impaired sequence is graphically highlighted.

* * * * *